United States Patent [19]

Eminger

[11] Patent Number: 4,844,410
[45] Date of Patent: Jul. 4, 1989

[54] ADJUSTABLE SEAT ASSEMBLY FOR A VALVE

[75] Inventor: Harry E. Eminger, East Greenwich, R.I.

[73] Assignee: Crosby Valve & Gage, Wrentham, Mass.

[21] Appl. No.: 226,424

[22] Filed: Jul. 29, 1988

[51] Int. Cl.$^4$ ............... F16K 25/00; F16K 43/00
[52] U.S. Cl. .................................. 251/159; 137/315; 251/161; 251/174; 251/315; 251/317; 251/363; 277/129
[58] Field of Search ............... 137/315; 251/159, 161, 251/174, 176, 315, 316, 317, 363; 277/126, 129

[56] References Cited

U.S. PATENT DOCUMENTS

| | | | |
|---|---|---|---|
| 2,316,933 | 4/1943 | Chaplin | 251/159 |
| 2,558,247 | 6/1951 | Hamer | 251/159 |
| 2,879,798 | 3/1959 | Anderson | 251/164 |
| 3,653,631 | 4/1972 | Hurst | 251/159 |
| 3,891,183 | 6/1975 | Feiring | 251/174 |
| 3,934,606 | 1/1976 | Matthews | 251/159 |
| 4,506,864 | 3/1985 | Hartmann | 251/174 |
| 4,727,901 | 3/1988 | Horvei | 137/315 |

FOREIGN PATENT DOCUMENTS 638668  4/1962  Italy ........................ 251/161

Primary Examiner—George L. Walton
Attorney, Agent, or Firm—Grimes & Battersby

[57] ABSTRACT

There is provided a seat assembly adapted to be received in a spool bore of a valve having a fluid controlling member for controlling the flow of fluid through the valve, with the spool bore having a threaded interior portion. The seat assembly includes a first member having, located towards one end thereof, a grooved ring adapted to receive a tool, and a threaded exterior portion which is adapted to threadedly engage the interior threaded portion of the spool bore. The seat assembly further includes a second member adapted to be received in the first member, with the second member having a seat face adapted to contact the fluid controlling member. The first member threadedly moves the second member between a first position where the seat face contacts the fluid controlling member of the valve to a second position where the seat face is remote from the fluid controlling member of the valve. An alternative seat assembly is adapted to slide in a spool bore of a valve having a fluid controlling member for controlling the flow of fluid through the valve. This seat assembly includes a first member having, located towards one end thereof, a grooved ring adapted to receive a tool, and a threaded exterior portion and a second member having a threaded interior portion which is adapted to threadedly engage the threaded exterior portion of the first member to provide axial movement between the first and the second members. The first member can be moved between a first position where the first member contacts the fluid controlling member of the valve to a second position where the first member is remote from the fluid controlling member of the valve.

16 Claims, 5 Drawing Sheets

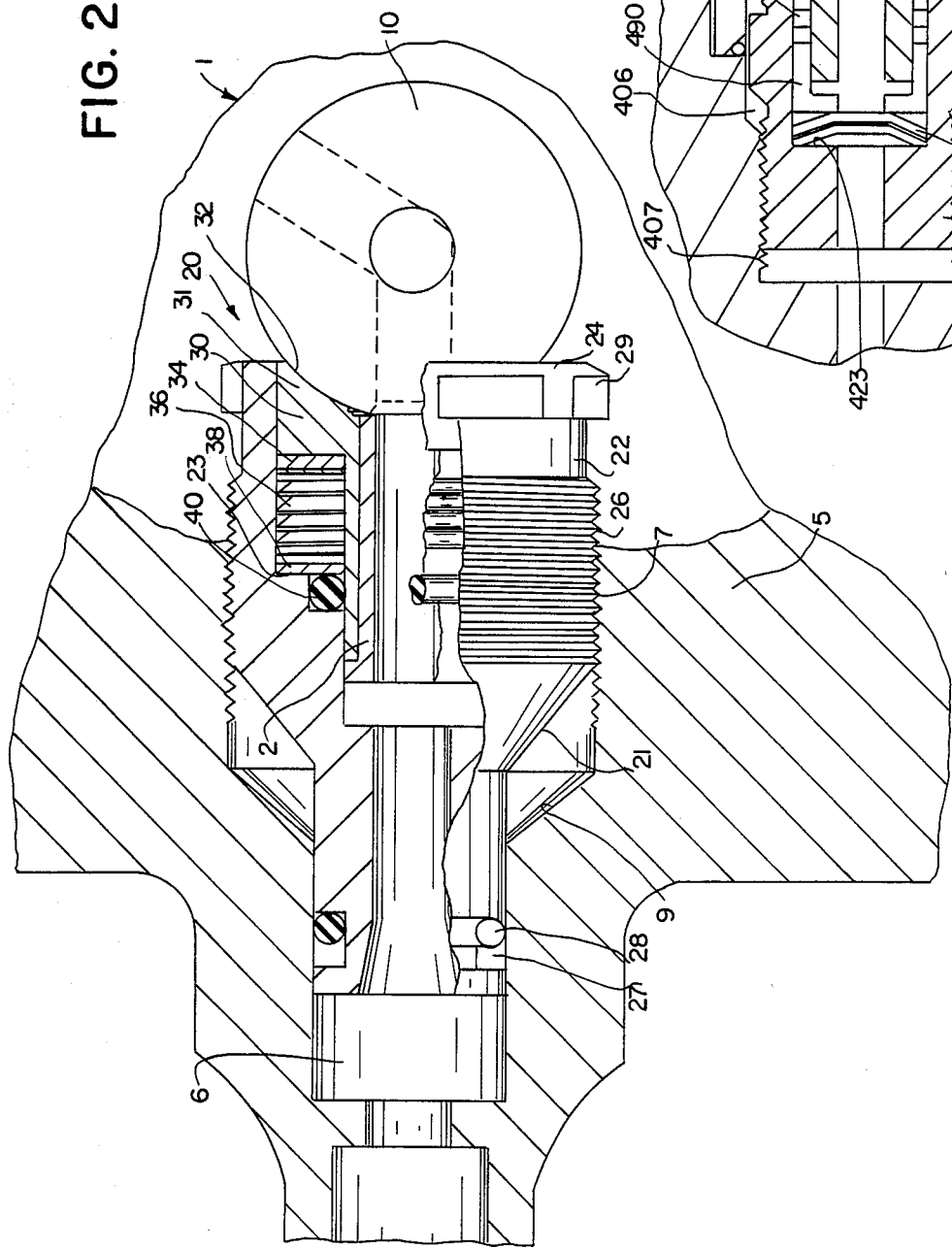

ADJUSTABLE SEAT ASSEMBLY FOR A VALVE

BACKGROUND OF THE INVENTION

I. Field of the Invention

The present invention relates generally to valves and, more particularly, to an adjustable seat assembly for such valves. While the seat assembly can be used in connection with any type of valve, the seat assembly is, preferably, used in connection with a ball valve and, more preferably, in connection with a top entry ball valve.

When used in a ball valve, the seat assembly of the present invention facilitates removal and insertion of the ball from the valve body, without the use of complex tools or equipment as heretofore required. In the case of other types of valves, the seat assembly facilitates insertion and removal of the valve component which directs the fluid flow. This, in turn, provides for easy replacement of the valve's seats. Moreover, the seat assembly provides for a rather precise and accurate adjustment of the ball/seat interface load over a wide range of pressures.

II. Description of the Prior Art

Valves, especially ball valves, are commonly used in coal gasification and liquefaction plants, nuclear facilities and the like to control the flow of liquids or gases. It is necessary, especially in a nuclear facility, that the valves do not leak or that the amount of leakage be minimal.

Many valves, such as ball valves, are secured in the fluid line and therefore cannot be removed.

Valve seats are typically positioned to interface with the ball of the valve to minimize leakage of the fluid between the ball and the valve body. The valve seats can be made of any non-metallic material, such as, for example, an elastomeric or a polymeric material, or of a metal material, depending on the temperature range and type of the fluids flowing through the valve. These seats must be periodically replaced when worn. Therefore, it is desired to provide for easy and rapid replacement of the seat.

Furthermore, since seat replacement is both costly and time consuming, it is desired to extend the life of the seat as much as possible. To accomplish this, the interface load between the seat and the ball must be appropriately set to minimize the pressure on the seat while maintaining the effectiveness of the seal formed by the seat and ball.

Many ball valves include a plurality of springs positioned in axial alignment with the seat so a to force the seat against the ball to establish a sealing load at the ball/seat interface. See, for example, U.S. Pat. No. 3,891,183 titled Sealing and Seat Assembly for Ball Valve Construction, which issued on June 24, 1975 to Monroe J. Feiring, and which is owned by the assignee of the present application. Heretofore, replacement of the valve seat was very difficult and somewhat dangerous. One method of removing the seat requires a technician to go through the top or bonnet area of the valve with specially designed tools. One type of tool is designed with basically a right angle configuration and is applied through the bonnet to catch the top of the front of the seat. The seat is physically forced back, i.e. away from the ball, overcoming the force of the springs for a sufficient distance to provide clearance so that the ball can then be removed. Thereafter, the seat is removed. This disassembly is problematic and dangerous due to the heavy loads and the expensive tools required to enter the valve through the bonnet and overcome the force of the springs. For example, it has been found that for a twenty-four inch valve there is required approximately ten thousand lbs. of force needed to push the seat assembly from the ball. Further, when the seat is placed in its operative position, it applies a pressure of approximately seven thousand lbs. on the ball.

Another type of tool consists of a pair of hydraulic or mechanical jacks which are placed in the valve body to simultaneously retract two valve seats. This type of tool is problematic since the jacks are difficult to align and, in addition, there is insufficient space in the valve to readily work with the tool.

Another method of removing the valve seat requires the tool to enter into the end of the valve and through the flow path to contact the valve seat. The seat must be constructed with groove portions to receive the tools. The seat is physically pulled back, i.e. away from the ball, to provide sufficient clearance to permit removal of the ball and thereafter removal of the seat. This disassembly is problematic since it is also necessary to overcome the forces of the springs to move the seat back, away from the ball. Further, this type of disassembly can only be used if the valve is of a type to permit access to the end of the valve. Many times to secure the ball valves in the line, the end of the valve becomes inaccessible so that this method of disassembly cannot be used.

In addition, the valves and their valve assemblies, do not, heretofore, provide means for adjusting the seat/ball interference load.

SUMMARY OF THE INVENTION

Against the foregoing background, it is a primary object of the present invention to provide an adjustable seat assembly for a valve.

It is another object of the present invention to provide such an adjustable seat assembly which provides for both removal of the seat from the valve and significant degree of adjustment of the load exerted by the valve seat against the ball at the point of contact, i.e. the seat and ball interface load.

It is yet another object of the present invention to provide such an adjustable seat assembly for a ball valve which permits easy insertion and removal of the ball and seat without the need for complex and expensive tools to overcome spring forces.

To the accomplishments of the foregoing objects and advantages, the present invention, in brief summary, comprises a seat assembly adapted to be received in a spool bore of a valve having a fluid controlling member for controlling the flow of fluid through the valve, with the spool bore having a threaded interior portion. The seat assembly includes first means having, located towards one end thereof, a grooved ring adapted to receive a tool, and a threaded exterior portion which is adapted to threadedly engage the interior threaded portion of the spool bore. The seat assembly further includes second means adapted to be received in said first means, with said second means having a seat face adapted to contact the fluid controlling member, wherein said first means threadedly moves said second means between a first position where said seat face contacts the fluid controlling member of the valve to a second position where said seat face is remote from the fluid controlling member of the valve.

The present invention also comprises a seat assembly adapted to be slidingly received in a spool bore of a valve having a fluid controlling member for controlling the flow of fluid through the valve. The seat assembly includes first means having, located towards one end thereof, a grooved ring adapted to receive a tool, and a threaded exterior portion. The seat assembly further includes second means having a threaded interior portion which is adapted to threadedly engage said threaded exterior portion of said first means to provide axial movement between said first and said second means, wherein said first means can be moved between a first position where said first means contacts the fluid controlling member of the valve to a second position where said first means is remote from the fluid controlling member of the valve.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIG. 2 is a sectional view of a portion of a ball valve using a first embodiment of the seat assembly of the present invention;

FIG. 3 consists of FIGS. 3A and 3B.

FIG. 7 is a sectional view of a portion of ball valve using a fifth embodiment of the seat assembly of the present invention and illustrating a lock ring for use in conjunction with the embodiment of the seat assemblies of the present invention

DESCRIPTION OF THE PREFERRED EMBODIMENTS

Figure 1:
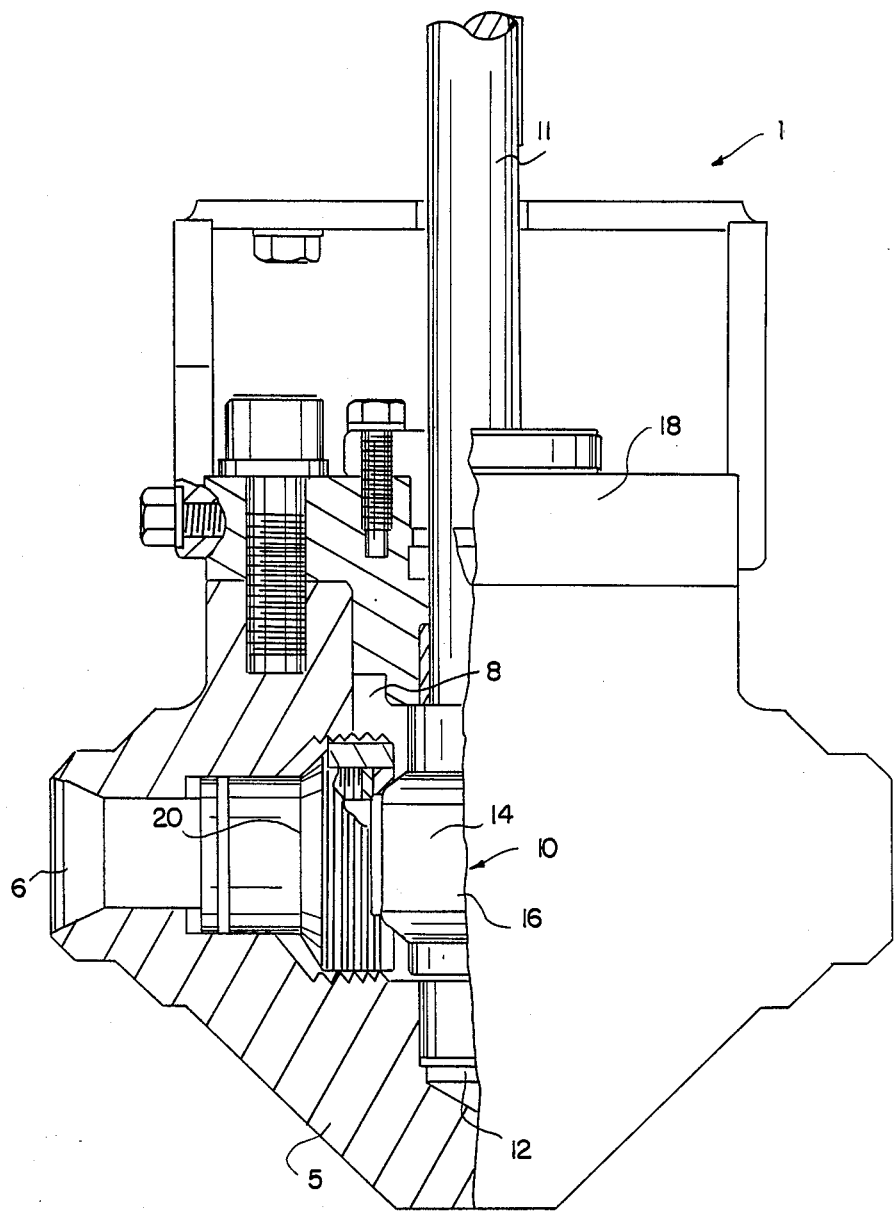
FIG. 1 is a partial elevation view of a top entry ball valve adapted for use in connection with the seat assembly of the present invention.

Referring to the drawings there is provided a valve, such as the top entry ball valve shown in FIG. 1, generally represented by reference numeral 1. The ball valve 1 includes a housing or body 5, at least two spool bores 6 (only one of which is shown), at least one seat assembly 20, and a ball or fluid controlling member 10 located on upper and lower trunnions 11, 12, respectively. It should be understood that in some valves not every spool bore needs a seat assembly. The area in the housing 5 between the spool bores 6 defines a circumferential space 8 which is sized to receive the ball 10 therein, and to permit rotation of the ball in the space.

The valve 1 is closed in a conventional manner by a bonnet 18 which has a central bore to permit the upper trunnion 11 of the ball valve to pass therethrough. The upper trunnion 11 is connected by conventional means to an actuator mechanism (not shown). The actuator mechanism, when activated, causes the ball to rotate in space 8 from the valve's open position which permits the passage of the medium, such as fluid or gas, to the valve's closed position which prevents the passage of the medium through the valve.

The ball 10 includes at least one passage 14. The ball 10 is sized and positioned in space 8 so that the passage 14 is aligned with the spool bores 6 of the valve housing 5. The valve also includes a pair of external surfaces 16 which are shaped so as to mate with the seat assembly 20 of the valve. With the ball 10 in its open position shown in FIG. 1, the fluid is permitted to pass from the first or inlet spool bore 6 through the passage to the other or outlet spool bore (not shown) in the valve housing 5. When the actuator mechanism is activated, the ball 10 rotates to a closed position (not shown) at which the surface 16 contacts the seat assembly 20 thereby preventing the passage of the fluid through the valve 1.

Referring to the first embodiment shown in FIG. 2, each valve 1 has a valve housing 5 with at least a pair of spool bores 6 (only one of which is shown) which is adapted to receive seat assembly 20 therein. Seat assembly 20 includes a seat or spool carrier 22 and a seat 30 which is adapted to be received within the seat carrier The seat carrier 22 of this embodiment has a grooved ring 24 located towards one end thereof, preferably at the edge of the carrier; a threaded exterior surface portion 26 which is adapted to mate with the threaded interior surface portion 7 of the spool bore 6; and an external circumferential groove 27 adapted to receive packing 28 therein. The carrier 22 is hollow and has at least one circumferential surface 23 which is adapted to react with the forces of the resilient elements.

The grooved ring 24 has a series of grooves 29 which are adapted to receive the tip of a conventional tool, such as, for example, a spanner wrench. The grooves are, preferably, uniformly spaced about the ring 24. Turning of the grooved ring 24 causes the threaded exterior portion 26 of carrier 22 to engage with the threaded interior portion 7 of the spool bore 6 so that the carrier moves towards or away from the ball 10 of the valve 1 depending upon the direction of rotation of the grooved ring. Upon the rotation of the ring 24 in one direction, the seat 30 travels towards the ball 10 until it establishes ultimate contact with the ball thus forming a leak tight seal with the seat. Alternatively, upon rotation of the ring 24 in the opposite direction, the seat carrier 22 travels away from the ball until it contacts a surface 9 in the interior of the valve body 5. The threads of the exterior portion 26 of the seat carrier 22 and the interior portion 7 of the spool bore 6 are sized and configured so as to mate with each other. The precise movement or adjustment of the carrier 22 with respect to the ball 10 of the valve 1 can be obtained by the amount of rotation of the carrier or the grooved ring 24.

The packing 28 engages the interior circumferential surface of the spool bore 6 to form a leak tight seal so that the fluid will not pass between the spool bore and the carrier assembly 20, specifically the seat carrier 22, when the carrier assembly is fully mounted in the spool bore.

The seat 30 may be an integral unit or, as shown in the FIG. 2 embodiment, may include a hollow tube or liner 2 and a body portion 31 adapted to fit about the liner. The body portion 31 has a seat face or surface 32 for engaging the ball 10 of the valve. The liner 2 includes, at the end opposite the face 32 end of the body portion 31, an enlargement to assist in the retention of the body portion of the seat thereon. In addition to the seat 30, the seat assembly 20 includes on the body portion 31 of the seat, a retaining ring 34 positioned adjacent the face 32, a plurality of resilient elements 36 positioned adjacent the retaining ring opposite the seat's face, a ring 38 positioned adjacent the plurality of resilient elements opposite the retaining ring 34, and a packing 40 positioned adjacent the ring 38.

The seat assembly shown in FIG. 2 is particularly adapted for use in a low to medium temperature valve. In this type of valve, the seat 30 can be made of any material that is suitable for such temperatures. Accordingly, the seat 30 can be made of a non-metallic material, such as, for example, an elastomeric or a polymeric material, or of a metal material. Further, the liner 2 can be made a one material, such as, for example, metal, while the body portion 31 can be made of another material, such as, for example, an elastomeric or a polymeric material. The retaining ring 34 can be made of a conventional material, such as, for example, metal. The plurality of resilient elements can also be made of any material and may have basically any configuration, provided they can be compressed and can transmit forces to the seat 30. The plurality of resilient elements can be, for example, a plurality of belleville springs, or wave springs or non-metallic elements.

The ring 38, like ring 34, can be made of any conventional material. The rings 34 and 38 act to separate the plurality of resilient elements 36 from the seat face 32 and the packing 40, respectively, and to provide surfaces for compressing the plurality of resilient elements therebetween.

Seat 30 is a self-energized seat and, therefore, does not have to overcome forces to be positioned in the valve. Accordingly, seat 30 is simply slid into the seat carrier 22 once the seat carrier is loaded into the spool bore 6. Specifically, to load the seat assembly 20 in the spool bore 6, one must first rotate the seat carrier 22 in a clockwise direction when viewed from the ball in view of the thread configuration in the embodiment shown. By this rotation, the seat carrier 22 threadedly engages the threaded interior surface portion 7 of the spool bore 6 to advance the seat carrier into the spool bore, i.e. in the direction away from the portion of the space 8 where the ball 10 of the valve 1 will be located. The seat carrier 22 is rotated until it cannot be rotated any further into the spool bore 6. This is achieved by the seat carrier 22 having a surface 21 which is adapted to contact surface 9 of the body 56 to prevent the seat carrier from being further rotated into the spool bore. It is understood that surfaces 21 and 9 can be of any configuration or shape provided the surfaces are shaped so that when they contact the seat carrier is prevented from further movement into the spool bore. The seat 30, which in the embodiment shown in FIG. 2 is self-energized, is then slid into the seat carrier 22.

Once all of the seat assemblies are installed into the valve body 5, the ball 10 is then inserted into the valve. As the grooved ring 24 of the seat carrier 22 is rotated in the opposite direction, the seat 30 mechanically advances toward the ball 10 of the valve. When the seat face 32 contacts the ball, the plurality of resilient elements start to compress. The amount of rotation of the seat carrier 22 determines the amount of movement of the seat 30 towards the ball and therefore the amount of pressure or interference load of the seat and the ball.

Figure 3B:
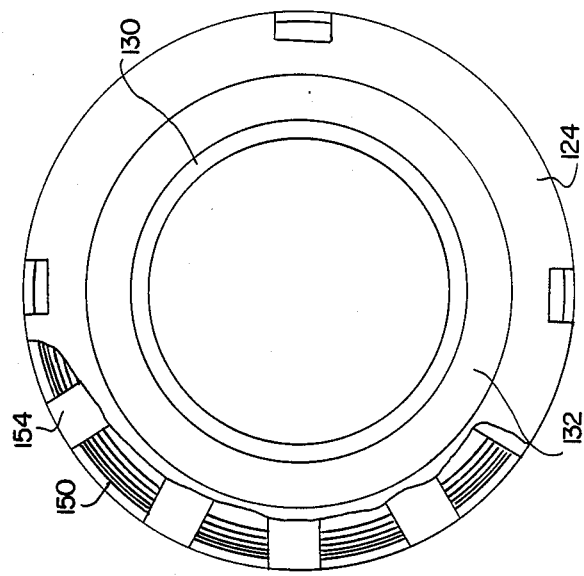
FIG. 3B is an end elevation view of the seat assembly of FIG. 3A.
Figure 3A:
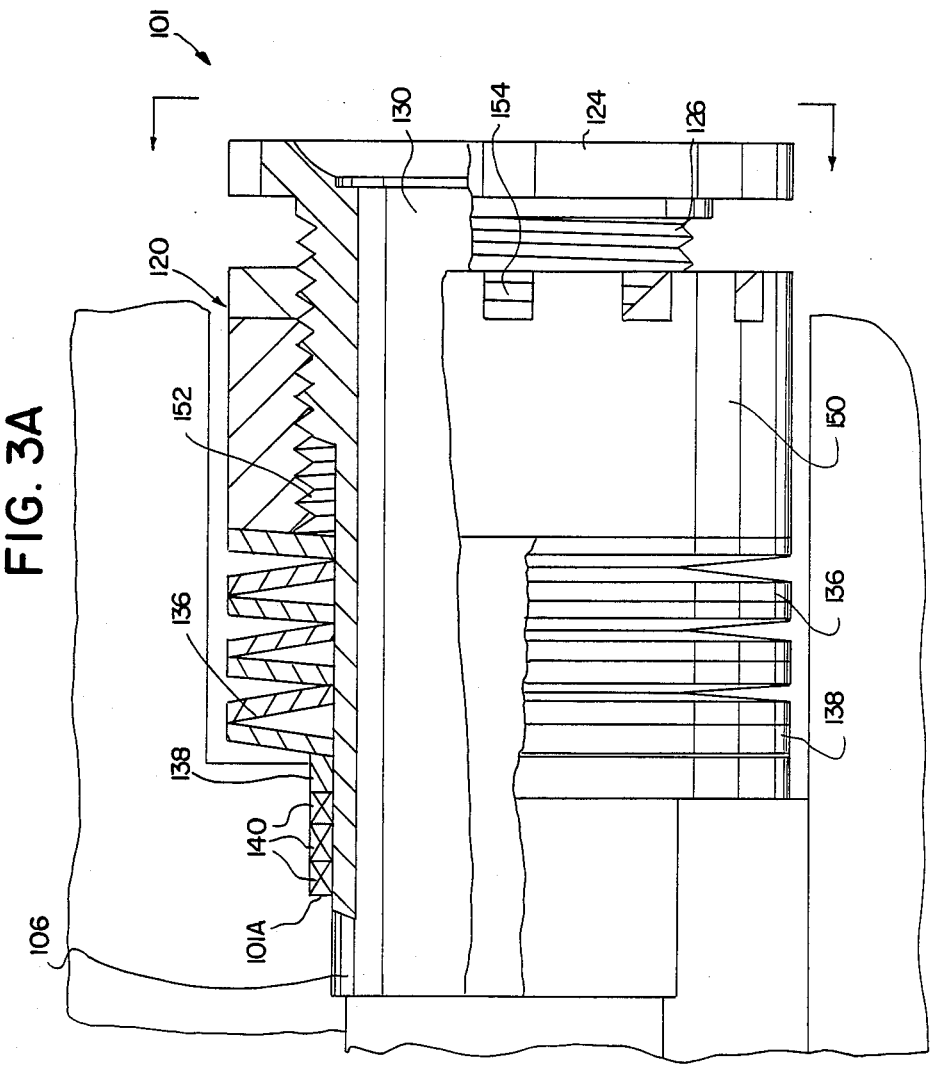
FIG. 3A is a side elevation view of a portion of a ball valve using a second embodiment of the seat assembly of the present invention.

The seat assembly 120 of the second embodiment of the present invention, shown in FIG. 3, is designed for a high temperature valve. High temperature valves require that the seat 130 of the valve be made of a material capable of withstanding the temperature of the fluid which passes through the valve. Such valves may have a seat face 132 which is made of a material, such as, for example, metal, graphite, ceramics and the like.

For a high temperature valve 101, it is preferred that the seat assembly 120 comprise a spool or spool seat 130 which, unlike the seat carrier 22 and seat 30 of the first or FIG. 2 embodiment, slides into and engages the interior surface of the spool bore 106. Accordingly, the interior surface of the spool bore 106 of the valve which engages the spool seat, preferably, is not threaded.

The seat assembly 120 basically includes a seat 130 having a seat face 132 and a load ring 150. The seat 130, preferably, has a uniformly diametered interior portion and a exterior surface having a grooved ring 124 located towards the edge of the seat and a threaded exterior surface portion 126 spaced slightly away from the grooved ring. The load ring 150 has a threaded interior surface portion 152 and a grooved exterior portion 154. The threaded interior portion 152 has threads of a size and configuration so as to engage the threaded exterior portion 126 of the seat 130. The seat assembly 120 also includes a plurality of resilient elements 136 positioned on the exterior surface of the seat 130 adjacent the load ring 150 and in axial alignment therewith, a ring or packing loader 138 positioned adjacent the plurality of resilient elements, and at least one packing ring 140 positioned adjacent the packing loader 138.

As with the plurality of resilient elements of the first embodiment, the elements 136 can have any configuration provided the elements axially align with the seat 130. Since this seat assembly 120 needs to be suitable for use in a valve exposed to high temperature fluids and gases, the elements 136 must be made of a material which will withstand such high temperatures. Accordingly, it is believed that the elements can be made of a metal, or a non-metal, material which can withstand the high temperatures. Likewise, the packing loader 138 and the packing 140 can be any material suitable to effect sealing at high temperatures.

The seat assembly 120 of the second embodiment of the present invention shown in FIG. 3 is loaded as follows. With the load ring 150 in the most forward position, i. e. against the grooved ring 124, the resilient elements 136, the packing loader 138, packing 140 are placed on seat 130 to comprise seat assembly 120. The seat assembly 120 is then installed in the valve body until the packing 140 abuts the shoulder or stepped surface 101A in the valve body. With the seat assembly then installed in the valve 101, the ball can then be installed.

To move the seat 130 and the load ring 150 away from each other, either one must be held stationary while the other is rotated. It is preferable in this embodiment to hold the seat 130 stationary and rotate the load ring 150 to avoid damage to the seat. Accordingly, with the seat 130 held stationary, as the load ring 150 is rotated rearward, i.e. away from the ball of the valve 101, on threads of the surface portions 126 and 152, the seat and load ring counter-rotate with respect to each other so that they move away from each other. Specifically, by the rotation of the load ring 150, the seat 130 moves axially toward the ball of the valve, while the load ring moves axially in the direction opposite the seat to exert a pressure on the plurality of resilient elements 136. This pressure causes the plurality of resilient elements 136 to compress together to thereby load the seat and, at the same time, to exert a pressure through the load ring 138 to force the packing 140 against the stepped surface 101A of the interior surface of the spool bore 106 thereby forming a liquid tight seal therebetween. The more that the load ring 150 is rotated, the greater the force with which the seat 130 presses against the ball, the greater the compression of the resilient elements 136 and the greater the sealing force between the packing 140 and the interior stepped surface 101A of the spool bore 106. As the seat face 132 begins to wear, the resilient elements 136 act, i.e. uncompress, to maintain the amount of pressure of the seat 130 against the ball.

It should be understood that the plurality of resilient elements 136 desire to uncompress. Accordingly, as the seat face 132 wears after a period of engagement with the ball, the resilient elements, by uncompressing, act to continue to exert a force onto the seat to maintain the interface load between the seat face and the ball. Therefore, the plurality of resilient elements 136 act to maintain the interface load between the seat face 32, and therefore the seat 130 and the ball after the bonnet is in place on the valve and the valve is in operation.

Figure 4:
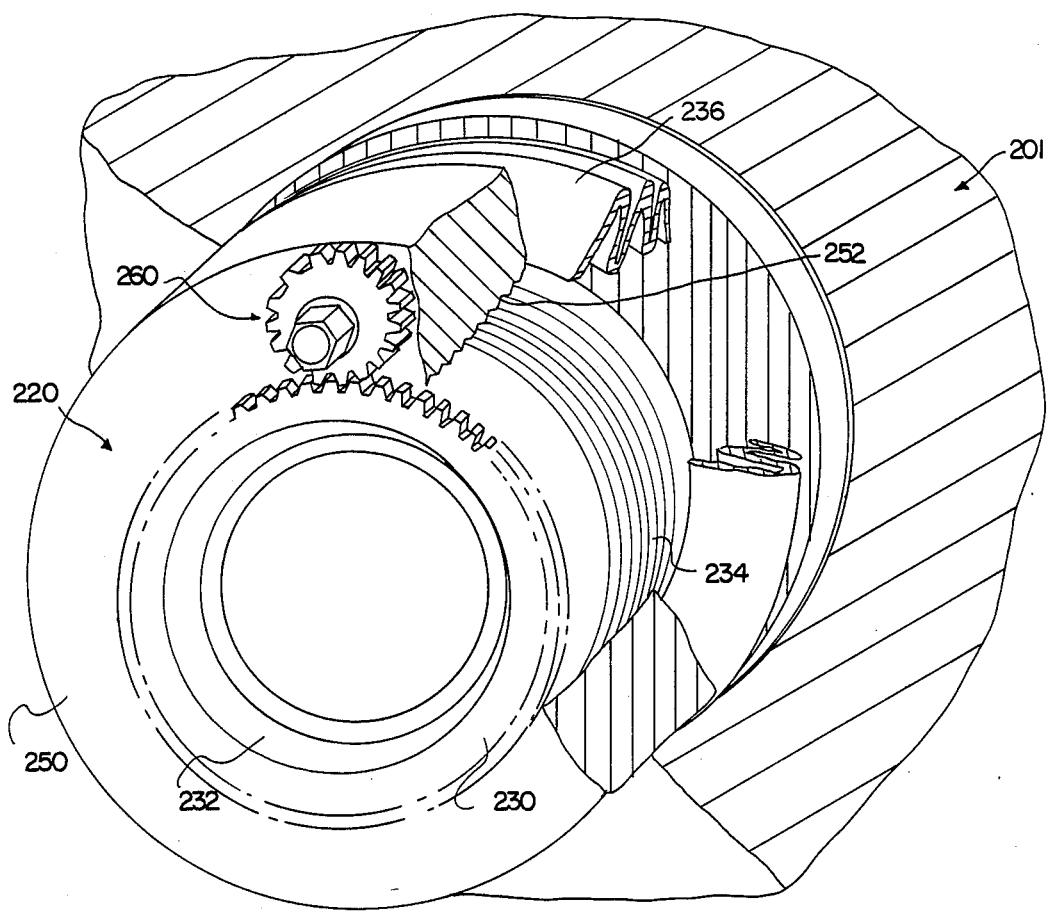
FIG. 4 is a sectional view of a portion of a ball valve using a third embodiment of the seat assembly of the present invention and illustrating a spur gear arrangement for use in connection with the seat assemblies of the present invention.
Figure 5:
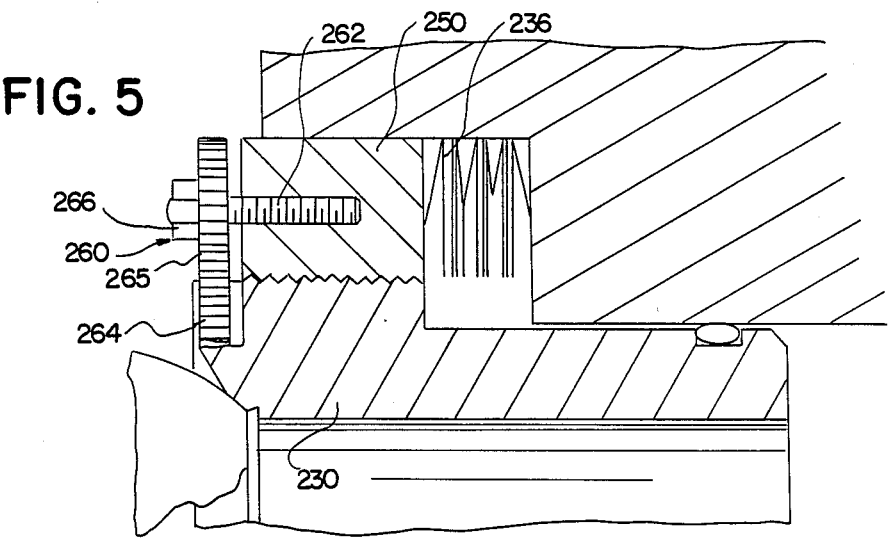
FIG. 5 is a side view of the seat assembly of FIG. 4.

Referring to the embodiment of FIG. 4 and 5, there is provided yet another seat assembly 220. The seat assembly 220 includes an adjustable nut 250 and a seat 230 having face 232 adapted to mate with the ball of the valve 201 and having a circumferentially, threaded exterior portion 234. The adjustable nut 250 has a circumferentially, threaded interior portion 252 which is adapted to threadedly engage with the threaded exterior portion 234 of the seat 230. Accordingly, the threads of the threaded interior portion 252 of the adjustable nut 250 are sized and configured to mate with the threads of the threaded exterior portion 234 of the seat 230.

In the seat assembly 230 shown in FIGS. 4 and 5, there is provided a plurality of resilient elements 236 positioned in axial alignment with the adjustable nut 250 and about the seat 230. There may also be provided on either or both sides of the plurality of resilient elements 236, a ring or rings (not shown). As with the other embodiments of the present invention, the resilient elements 236 can be made of any material suitable for use at the temperatures of the fluids or gases passing through the valve seat assembly 220.

This seat assembly 220 acts the same as the seat assembly 120 of the second embodiment of the present invention in that to move the adjustable nut 250 and the seat 230 apart or towards each other, one of the two must be held stationary while the other is rotated. It is believed preferable that the adjustable nut 250 be rotated. Rotation of the adjustable nut 250 causes counter-rotation of the seat 230 so that they move apart. Specifically, the seat 230 moves towards the ball of the valve 201 and at the same time the adjustable nut 250 compresses the plurality of resilient elements so that the seat is loaded.

A further feature of the present invention which is shown in FIGS. 4 and 5, but can be used in conjunction with the seat assembly of all of the embodiments of the present invention, is a mechanical mechanism 260. The mechanical mechanism 260 includes a pin 262 mounted in the adjustable nut 250, and a spur gear 265 mounted on the pin for engagement with the teeth or other teeth-type portion 264 of the seat 230. The pin is secured into the adjustable nut 250 and, preferably is fixedly mounted therein The spur gear 265 is adapted to slide onto the pin 262 and has fixed thereto or, preferably, integral therewith a hex nut 266. The hex nut 266 is adapted to receive any conventional wrenching device to cause the spur gear 265 to rotate which, in turn, engages teeth 264 causing counter-rotation of the adjustable nut 250 and the seat 230.

This mechanical mechanism 260, which is merely representative of the mechanism which can be used, is used to provide one with a mechanical advantage in larger diameter valves. Specifically, in valves having a diameter of approximately eight inches or more, it is very difficult to use a spanner wrench on the adjustable nut or the rotating portion of the seat assembly to get the adjustable nut or seat assembly to counter-rotate away from each other. Accordingly, the use of spur gears and the like creates a linking mechanism which gives the user a mechanical advantage in that the structural connection of the parts requires less force to turn the rotating components. This mechanical mechanism, as stated previously, can be used, as an addition, to any of the seat assemblies of the present invention. Thus, the mechanical mechanism 260 can be used with an elastomeric-type or low-medium temperature seat assembly, such as that shown in the FIG. 2 embodiment of the present invention, or with a metal-type or high temperature seat assembly, such as that shown in the FIG. 3 embodiment of the present invention.

Further, the exact structure of the mechanical mechanism 260 can vary in size, shape and configuration of the elements and the placement of the elements, provided that the force of the user is transferred in the mechanism to create a mechanical advantage, i.e. an improved transfer of forces, thereby minimizing the force needed by the user of the wrench to rotate the rotating components of the seat assembly.

Figure 6:
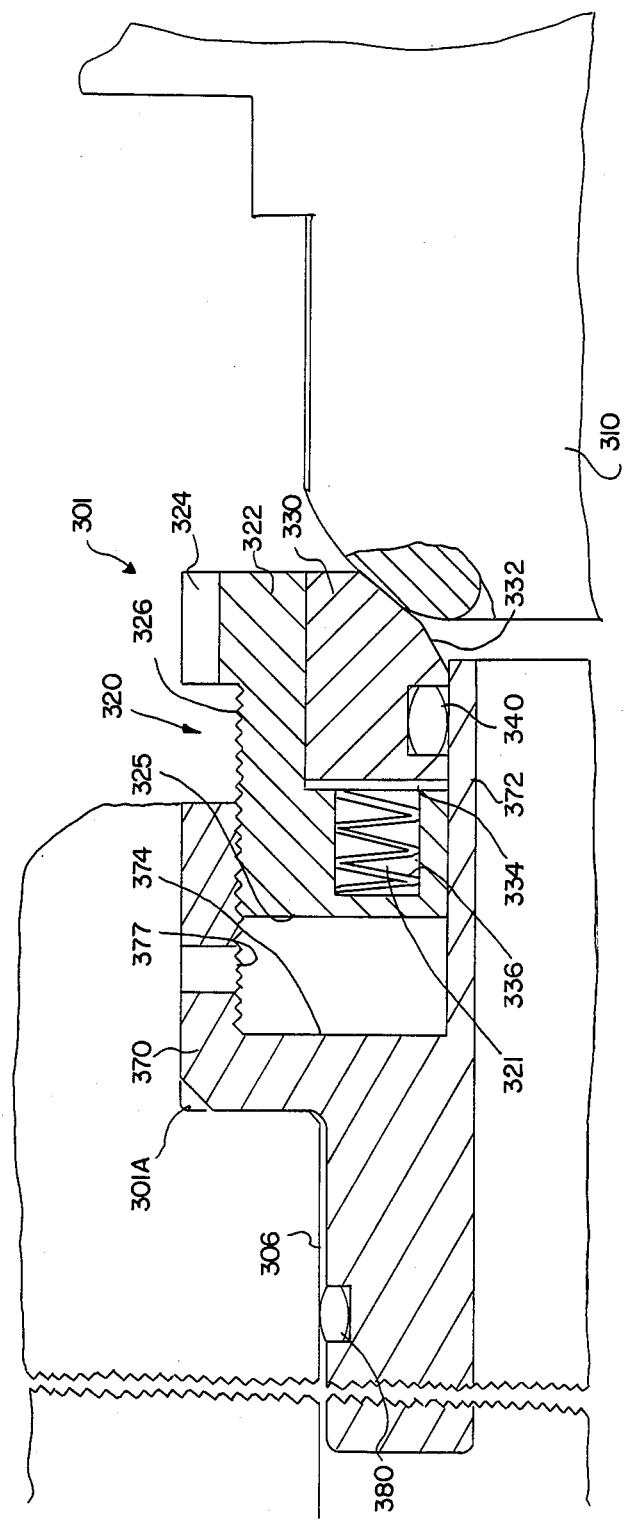
FIG. 6 is a sectional view of a portion of a ball valve using a fourth embodiment of the seat assembly of the present invention.

FIG. 6 illustrates another seat assembly 320 of the present invention. Specifically, the seat assembly 320 includes a seat carrier 322 having an L-shaped configuration and a seat 330. The seat carrier 322 has a threaded exterior surface portion 326 and a grooved ring 324 located at or towards the edge of the seat carrier. The seat carrier 322 also includes a plurality of chambers 321 located circumferentially around the seat carrier.

The threaded exterior portion 326 is adapted to engage the threaded interior portion 377 of the spool carrier 370, while the exterior surface of the spool carrier 370 is adapted to engage the interior surface of the spool bore 306 of the valve 301. The seat 330 has an aperture portion for receipt of a packing 340 therein so as to form a leak tight seal between the seat 330 and the spool carrier 370. In axial alignment with the seat 330, there is provided a ring 334. Adjacent the ring 334, there is provided a plurality of resilient elements 336. The plurality of resilient elements 336 are positioned in the plurality of chambers 321 of the carrier 320. As also shown in FIG. 6, the spool carrier 370 has a groove for receipt of a packing 380 which forms a leak tight seal with the interior surface of the spool bore 306.

To load the seat assembly 320 in the spool bore 306, the spool carrier 370 is first slid into the spool bore. The seat carrier 322 is then rotated into the spool carrier 370 so that the threaded portion 377 of the spool carrier engages the threaded portion 326 of the seat carrier and is screwed together until the back surface 325 of the seat carrier 322 contacts the surface 374 of the spool carrier Thereafter, the resilient elements 336 are positioned in the plurality of chambers 321 and then ring 334 is positioned adjacent the resilient elements in the chamber. The seat 330 with seal or packing 340 positioned thereon is then slid into the area formed between the seat carrier 322 and the spool carrier 370. With the seat assembly 320 thus installed, the ball 310 can be positioned into the valve 301.

As the seat carrier 322 is then rotated towards the ball 310, the face 332 of the seat 330 engages the ball 310 of the valve 301 and the plurality of resilient elements 336 compress and exert pressure on the seat 330 so that the seat creates a leak tight seal between the face 332 of the seat and the ball. At the same time, the spool carrier 370, as a reaction, reacts with the surface 301A of the valve 301.

In all of the seat embodiments heretofore described, it should be noted that once the seat carrier has been rotated so as to move the seat forward to effect the desired interface load between the seat and the ball, it is necessary that the seat or carrier not rotate during reassembly of the bonnet or during valve operation. One means to prevent this rotation is to provide a series of pin-like elements on the bonnet 18 of FIG. 1 which engage the grooves in the grooved rings, such as, for example, grooved ring 24 of the seat assembly 20.

Referring to the fifth embodiment of the present invention which is shown in FIG. 7, the seat assembly 420 includes a seat or spool carrier 422, a seat 430, a packing loader 490 spaced from the seat by a plurality of packing rings 480 and a plurality of resilient elements 436 adjacent the packing loader and opposite the plurality of packing rings. The seat carrier 422 has basically an L-shaped configuration so as to form an interior step 423. The seat carrier 422 also has a grooved ring 424 on the edge thereof adapted to receive a tool for rotating the seat carrier, and a threaded exterior portion 426. The threaded exterior portion 426 is adapted to engage the threaded interior portion 407 of the spool bore 406 of the valve housing.

The seat 430 is positioned adjacent and in axial alignment with the plurality of packing rings 480. An L-shaped packing loader 490 is positioned adjacent the plurality of packing rings with one leg of the packing loader being in axial alignment with the plurality of packing rings. Adjacent the remaining leg of the L-shaped packing loader 490, there is provided the plurality of resilient elements 436. The plurality of resilient elements 436, on the side opposite the packing loader 490, is adjacent the step of the seat carrier 430.

The seat 430, as all of the seats of the present invention, can be made of any material which can withstand the temperatures at which the seat assembly shall be used. Such materials may be, for example, metal or non-metals, such as, elastomeric, polymeric, ceramics and graphites. Likewise, the packing loader 490 can be made of material which is also suitable for use at the temperatures of the fluids or gases which the seat assembly 420 shall be used.

As an alternative feature illustrated in FIG. 7, but adapted for use in connection with all of the seat assemblies of the present invention, is a lock ring 500. The lock ring 500 has a plurality of internal threads which are complementary, i.e. adapted to engage the threaded exterior portion 426 of the seat carrier 422. By rotating of the lock ring 500 onto the seat carrier 422 after the seat carrier is in position in the valve, the seat carrier is prevented from further rotation. Accordingly, the lock ring 500 serves as a lock nut to hold the spool or seat carrier in place which is a function that, heretofore, needed to be specifically provided for either in the bonnet of the valve or by other means. Further, the lock ring 500 has the provision for receipt of a second packing ring 530 which serves to seal the spool bore 406 of the body to the seat carrier 422.

The number of threads per inch for the threaded exterior portion 426 of the seat carrier 422 and the mating threaded interior portion of the spool bore 406 of the valve is predetermined so that the precise movement of the seat 430 towards the ball 410 of the valve can be determined by the number of rotations of the seat carrier. For example, if there are eight threads per inch, one rotation of the seat carrier 422 will compress the springs one eight of an inch. After the plurality of resilient elements 436 have been compressed a predetermined amount, the elements shall act to urge packing loader 490 against the packing rings 480 to thereby form a leak tight seal between the seat 430 and the seat carrier 422 and will also urge or force the seat against the ball 410 of the valve to form a leak tight seal therebetween.

Having thus described the invention with particular reference to the preferred forms thereof, it will be obvious that various changes and modifications may be made therein without departing from the spirit and scope of the invention as defined by the appended claims.

Wherefore, claim:

1. A seat assembly adapted to be received in a spool bore of a valve having a fluid controlling member for controlling the flow of fluid through the valve, the spool bore having a threaded interior portion, said seat assembly comprising:

first means having a bore and having, located towards one end thereof, a ring adapted to receive a tool, and a threaded exterior portion which is adapted to threadedly engage the threaded interior portion of the spool bore; and second means adapted to be received within said bore of said first means, said second means having a seat face adapted to contact the fluid controlling member, wherein said first means moves said second means between a first position where said seat face contacts the fluid controlling member of the valve to a second position where said seat fact is remote from the fluid controlling member of the valve when said first means is threadedly moved in the spool bore.

2. The seat assembly of claim 1, further comprising a plurality of resilient elements on said second means to maintain said seat face against the fluid controlling element.

3. The seat assembly of claim 1, wherein said second means includes a hollow liner and a seat body adapted to fit on said liner.

4. The seat assembly of claim 1, further comprising a retaining ring positioned on said second means adjacent said seat face, a plurality of resilient elements positioned on said second means adjacent said retaining ring and opposite said second means, a ring positioned on said seat body adjacent said plurality of resilient elements and opposite said retaining ring, and a packing positioned on said seat face adjacent said ring and opposite said plurality of resilient elements 5. The seat assembly of claim 1, further comprising a locking ring for placement about said first means to prevent rotation of said first means.

6. The seat assembly of claim 1, further comprising a locking ring for placement about said first means to prevent rotation of said first means and for sealing the leak path formed between the spool bore and said first means.

7. The seat assembly of claim 1, further comprising a mechanical mechanism which includes a pin mounted in the valve on which a spur gear is mounted, said spur gear adapted to engage said first means for rotation thereof.

8. The seat assembly of claim 1, further comprising a plurality of packing rings positioned adjacent and in axial alignment with said second means, an L-shaped packing loader positioned adjacent said plurality of packing rings with one leg of said packing loader being in axial alignment with said plurality of packing rings, and a plurality of resilient elements positioned adjacent the other leg of said packing loader and opposite the plurality of packing rings.

9. A seat assembly adapted to be slidingly received in a spool bore of a valve having a fluid controlling member for controlling the flow of fluid through the valve, said seat assembly comprising:
   first means having, located towards one end thereof, a ring adapted to receive a tool, and having a threaded exterior portion;
   second means having a threaded interior portion which is adapted to threadedly engage said threaded exterior portion of said first means to provide axial movement between said first and said second means; and
   a plurality of resilient elements positioned on said first means adjacent said second means and in axial alignment therewith, a packing loader positioned adjacent said plurality of resilient elements, and at least one packing ring positioned adjacent said packing loader, said plurality of resilient elements having a first and which acts directly on said second means and having a second end which acts directly on said packing loader,
   wherein said first means can be moved between a first position where said first means contacts the fluid controlling member of the valve to a second position where said first means is remote from the fluid controlling member of the valve.

10. The seat assembly of claim 9, further comprising a plurality of resilient elements positioned and in direct axial alignment with said second means and about said first means.

11. The seat assembly of claim 9, further comprising a locking ring for placement about said first mean to prevent rotation of said first means.

12. A seat assembly adapted to be slidingly received in a spool bore of a valve having a fluid controlling member for controlling the flow of fluid through the valve, said seat assembly comprising:
   a spool carrier having an exterior portion adapted to fit in the spool bore, and having a threaded interior portion, said spool carrier having a spool cavity;
   a seat carrier adapted to be received in said spool cavity, said seat carrier having a seat cavity, said seat carrier also having, towards one end thereof, a ring, and having a threaded exterior portion adapted to threadedly engage said threaded interior portion of said spool carrier; and
   a seat adapted to be received in said seat cavity,
   wherein rotation of said ring by a tool causes rotation of said seat carrier in said spool carrier which moves said seat between a first position where said seat contacts the fluid controlling member of the valve to a second position where said seat is remote from the fluid controlling member of the valve.

13. The seat assembly of claim 12, wherein said seat carrier includes a plurality of chambers 14. The seat assembly of claim 13, further comprising a ring in axial alignment with said seat, and a plurality of resilient elements positioned in said plurality of chambers and adjacent said ring.

15. A seat assembly adapted to be slidingly received in a spool bore of a valve having a fluid controlling member for controlling the flow of fluid through the valve, said seat assembly comprising:
   first means having, located towards one end thereof, a ring adapted to receive a tool, and having a threaded exterior portion;
   second means having a threaded interior portion which is adapted to threadedly engage said threaded exterior portion of said first means to provide axial movement between said first and said second means;
   a plurality of resilient elements positioned in axial alignment with said second means and about said first means, said plurality of resilient elements having a first end which acts directly on said second means and having a second end which acts directly on said spool bore; and
   a mechanical mechanism which includes a pin mounted in said second means having a spur gear mounted thereon, said spur gear adapted to engage said first means so that rotation of said second means causes rotation of said first means through said mechanical mechanism,
   wherein said first means can be moved between a first position where said first means contacts the fluid controlling member of the valve to a second position where said first means is remote from the fluid controlling member of the valve.

16. The seat assembly of claim 15, further comprising a pair of rings one provided adjacent each end of said plurality of resilient elements.

* * * * *